United States Patent [19]

Kageyama et al.

[11] Patent Number: 5,049,643
[45] Date of Patent: Sep. 17, 1991

[54] WHOLLY AROMATIC POLYESTER FROM MIXTURE OF NAPHTHALENE DICARBOXYLIC ACID

[75] Inventors: Yukihiko Kageyama; Toshio Nakane; Kenji Hijikata, all of Shizuoka, Japan

[73] Assignee: Polyplastics Co., Ltd., Osaka, Japan

[21] Appl. No.: 492,902

[22] Filed: Mar. 13, 1990

[30] Foreign Application Priority Data

Mar. 13, 1989 [JP] Japan ................................. 1-60231

[51] Int. Cl.⁵ ..................... C08G 63/02; C08G 63/18; C08G 8/02; C08J 67/00
[52] U.S. Cl. ................................. 528/194; 524/601; 528/125; 528/176; 528/190; 528/192
[58] Field of Search ............... 528/176, 190, 194, 125, 528/192; 524/601

[56] References Cited

U.S. PATENT DOCUMENTS 3,935,166 1/1976 Kanai et al. ................. 528/194

FOREIGN PATENT DOCUMENTS 2330575 1/1975 Denmark .
48-072295 9/1973 Japan .
48-097098 12/1973 Japan .

Primary Examiner—Harold D. Anderson
Assistant Examiner—T. Mosley
Attorney, Agent, or Firm—Burns, Doane, Swecker & Mathis

[57] ABSTRACT

A wholly aromatic polyester is composed of naphthalene dicarboxylic acid units comprising 5 to 95 mole % of the unit having the formula (1) and 95 to 5 mole % of the unit having the formula (2) and aromatic diol units having the formula (3). It is improved in heat resistance and may be blended with a filler.

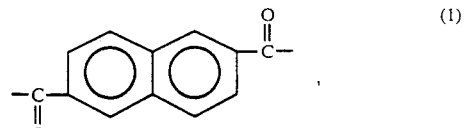

(1)

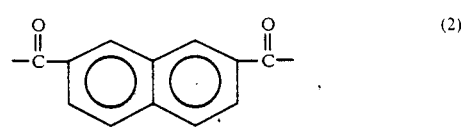

(2)

and

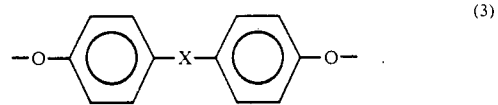

(3)

11 Claims, No Drawings

WHOLLY AROMATIC POLYESTER FROM MIXTURE OF NAPHTHALENE DICARBOXYLIC ACID

The present invention relates to a novel transparent wholly aromatic polyester excellent in heat resistance.

PRIOR ART

Up to this time, polyacrylates, polystyrene, polycarbonates, polyarylates, polyethylene terephthalate, and polysulfones are well known as transparent polymers which are industrially useful. Among them, polyethylene terephthalate, polyarylate and polysulfone are representatively used for applications where heat resistance is required. Particularly, polyethylene terephthalate and polyarylate are advantageously used in the field necessitating both transparency and heat resistance, because the raw materials of them are easily available and the polymerization thereof is easy. However, polyethylene terephthalate cannot cope with the applications where further enhanced heat resistance is required with the enlargement of the service temperature range. Meanwhile, polyarylate does not always exhibit clear transparency owing to the yellowing caused in the preparation thereof.

SUMMARY OF THE INVENTION

In view of the above problems, the inventors of the present invention have intensively studied to obtain a polyester having a further enhanced heat resistance and have found that a polyester comprising specified constituent units is excellent in both the transparency and heat resistance. The present invention has been accomplished on the basis of this finding.

Namely, the present invention provides a wholly aromatic polyester excellent in transparency prepared by the reaction of a naphthalenedicarboxylic acid or an ester-forming derivative thereof with an aromatic diol or an ester-forming derivative thereof, characterized in that the naphthalenedicarboxylic acid unit is composed of acid residues represented by formulas (1) and (2) with the proviso that the acid residue represented by the formula (2) is contained in an amount of 5 to 95% based on the total amount of both residues and that the aromatic diol unit is an alcohol residue represented by formula (3):

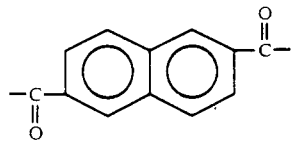
(1)

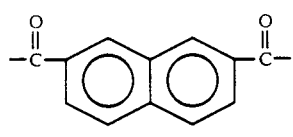
(2)

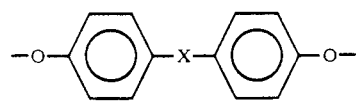
(3)

wherein X is one or more groups selected from among alkylene, alkylidene, —O—, —S—, —SO₂— and —CO—.

The invention provides an aromatic polyester composed naphthalene dicarboxylic acid units comprising 5 to 95 mole % of the unit having the formula (1) and 95 to 5 mole % of the unit having the formula (2) and aromatic diol units having the formula (3).

The naphthalenedicarboxylic acid unit constituting the polyester of the present invention must be substantially composed of a naphthalenedicarboxylic acid residue having main chain bonds at positions 2 and 6 (hereinafter abbreviated to "2,6-bonded residue") and a naphthalenedicarboxylic acid residue having main chain bonds at positions 2 and 7 (hereinafter abbreviated to "2,7-bonded residue).

The total amount of the 2,6-bonded and 2,7-bonded residues must be at least 85 mole % based on the total amount of the whole naphthalenedicarboxylic acid units. In addition to these residues, naphthalene-1,4, 1,5, 1,6 or 1,7-dicarboxylic acid residue may be contained in a small amount.

The polyester of the present invention is characterized in that two kinds of naphthalenedicarboxylic acid residues different from each other in the positions at which the main chains are bonded are contained to thereby exhibit characteristics which cannot be exhibited when only either of the residues is contained. By combining at least two kinds of naphthalenedicarboxylic acid residues different from each other in the positions at which the ester linkages are bonded, the softening point and stiffness of a polyester polymer can be easily controlled, so that the obtained polyester is extremely excellent in transparency, heat resistance and physical properties.

The 2,6-bonded and 2,7-bonded residues are each contained in an amount of 5 to 95 mole % based on the total amount of both residues. It is preferable that the 2,7-bonded residue be contained in an amount of 10 to 80 mole %. If the amount of either of the residues exceeds 95 mole %, the resulting polyester will be poor in heat resistance, toughness and transparency.

The monomers to be used as raw materials for providing the naphthalenedicarboxylic acid unit may be naphthalenedicarboxylic acids or ester-forming derivatives thereof, such as chloride, methyl ester, ethyl ester or phenyl ester thereof.

The aromatic diol unit constituting the polyester of the present invention is a diol residue represented by the general formula (3) wherein X is a group selected from among alkylene, alkylidene, —O—, —S—, —SO₂— and —CO—. Particular examples of the alkylene and alkylidene groups include

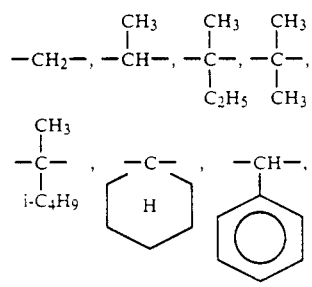

-continued

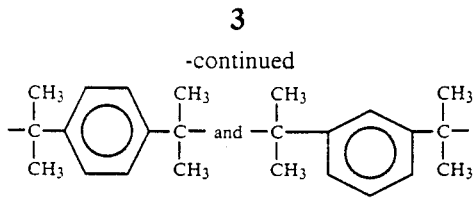

It is preferable that X be an alkylidene group or —SO₂— or —CO—, still preferably a propylidene group or —SO₂—. The monomer to be used for providing the aromatic diol unit may be an aromatic diol corresponding to a residue represented by the formula (3) or an ester-forming derivative thereof, such as an ester thereof with acetic or propionic acid.

Preferred examples of the aromatic diol and ester-forming derivatives thereof include 4,4'-dihydroxydiphenylpropane (bisphenol A) and ester-forming derivatives thereof and 4,4'-dihydroxyphenyl sulfone (bisphenol S) and ester-forming derivatives thereof, the former being particularly preferred.

The transparent polyester of the present invention does not cause any progress of crystallization even when aged at high temperature, thus not turning into an opaque one but being kept transparent.

Meanwhile, a polymer containing, in its skeleton, a stiff segment similar to that of the polymer of the present invention is liable to exhibit a liquid-crystal property and, if it is a liquid-crystal one, it should be opalescent even in the form of thin film. However, the transparent polyester of the present invention does not exhibit any liquid-crystal properties, which is ascertained by microscopy using crossed nicols. That is, when a liquid-crystal polyester is observed under a microscope between crossed nicols fitted with a hot stage, the visual field causes no darkening in the vicinity of the softening point, so that the visual field is light even in a molten state to exhibit a liquid-crystal pattern, while when the polyester of the present invention is observed under a microscope between crossed nicols, a dark visual field is maintained in the vicinity of the softening point. Thus, the polyester of the present invention can be distinguished from a liquid-crystal polyester.

As well known, even a crystalline polymer can be sometimes converted into a transparent film by quenching. However, such a transparent film causes the progress of crystallization by thermal annealing to lose its transparency. Further, a crystalline polymer exhibits a clear crystallization peak and melting peak in DSC and the visual field of the polymer between crossed nicols causes darkening at the melting point (softening point). On the other hand, the polymer of the present invention keeps a dark visual field between crossed nicols in the vicinity of the softening point, thus being also clearly distinguishable from a crystalline polymer. The transparency of the polymer of the present invention is an essential property due to the nature of an amorphous polymer.

Namely, the polyester of the present invention exhibits neither liquid-crystal property nor crystalline property, thus being always transparent.

The copolyester of the present invention can be prepared by copolymerizing naphthalenedicarboxylic acids or ester-forming derivatives thereof corresponding to the residues of the formulas (1) and (2) with an aromatic diol or an ester-forming derivative thereof corresponding to the residue of the formula (3) according to a conventional process such as melt polymerization, solution polymerization or interfacial polymerization. Particularly, it is suitable to polymerize naphthalenedicarboxylic acids or esters thereof with a lower aliphatic acid with an aromatic diol according to the melt-polymerization method. Still particularly, the transesterification of the esters is more general than the direct polycondensation method using the free acids. In the copolymerization, any conventional catalyst for transesterification may be used and examples of the catalyst include titanium catalysts such as tetrabutoxytitanium and tetraethoxytitanium; tin catalysts such as dialkyltin oxide and diaryltin oxide; antimony trioxide; zinc acetate, manganese acetate, alkali metal salts of a carboxylic acid, such as sodium acetate, and alkaline earth metal salts.

These catalysts are each preferably used in an amount of about 0.001 to 1% by weight, still preferably 0.01 to 0.2% by weight, based on the total amount of the monomers used.

In order to increase the molecular weight of the polymer thus prepared, the polymer may be heated in a vacuum or in an inert gas atmosphere to a temperature lower than the melting point of the polymer, while keeping the polymer in a solid state.

Various stabilizers and/or fillers may be added to the polyester of the present invention and the stabilizer includes antioxidant, heat stabilizer, ultraviolet absorber and discoloration inhibitor, while the filler includes fibrous, powdery, granular and flaky, organic and inorganic fillers.

The fibrous filler includes inorganic fibrous materials, for example, glass fiber, asbestos fiber, silica fiber, silica/alumina fiber, alumina fiber, zirconia fiber, boron nitride fiber, silicon nitride fiber, boron fiber, potassium titanate fiber and fibers of metals such as stainless steel, aluminum, titanium, copper or brass. Among them, glass fiber is most representative. Further, the fibrous filler includes high-melting organic fibrous materials and particular examples thereof include polyamides, fluororesins and polyester resins.

The powdery and granular fillers include carbon black, graphite, silica, quartz powder, glass bead, milled glass fiber, glass balloons, glass powder, silicates such as calcium silicate, aluminum silicate, kaolin, talc, clay, diatomaceous earth and wollastonite; metal oxides such as iron oxide, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride, boron nitride and various metal powders.

The flaky filler includes mica, glass flake and various metal foils.

The organic filler includes heat-resistant, high-strength and high-stiffness fibers such as aromatic polyester fiber, liquid-crystal polymer fiber and aromatic polyamide and polyimide fibers.

These organic and inorganic fillers may be used alone or as a mixture of two or more of them. The simultaneous use of a fibrous filler with a powder, granular or flaky filler is particularly effective in producing an article which is excellent not only in mechanical strengths but also in dimensional accuracy and electrical properties. The amount of the inorganic filler to be added is 95% by weight or below, preferably 1 to 80% by weight, based on the total amount of the composition.

If necessary, these fillers may be each used together with a sizing agent or surface treatment.

Further, other thermoplastic resin may be auxiliarily added to the polyester of the present invention in such a range as not to hinder the object of the present invention.

Examples of the thermoplastic resin to be auxiliarily added include polyolefins such as polyethylene and polypropylene; aromatic polyesters prepared by the polycondensation of an aromatic dicarboxylic acid with a diol, such as polyethylene terephthalate and polybutylene terephthalate, or that of a hydroxy carboxylic acid, polyacetal (homo- and copolymers); polystyrene; polyvinyl chloride; polyamide; polycarbonate; ABS; polyphenylene oxide; polyphenylene sulfide and fluororesins. These thermoplastic resins may be also used as a mixture of two or more of them.

EFFECT OF THE INVENTION

The wholly aromatic polyester of the present invention is excellent in transparency and heat resistance and is amorphous, so that neither lowering in the transparency nor deformation is caused even after the long-term exposure to a high-temperature atmosphere.

Such excellent characteristics are favorable for various articles molded by extrusion, blowing or injection including film and sheet, particularly for film. The wholly aromatic polyester of the present invention can be molded by these processes and used in various fields including packaging material for foods, transparent cases, protective plate for light source, optical lens and compact disc.

EXAMPLE

The present invention will now be described in more detail by referring to the following Examples, though the present invention is not limited to them. In the Examples, all parts are by weight.

EXAMPLE 1

312 parts of 4,4'-diacetoxydiphenylpropane, 108 parts of 2,6-naphthalenedicarboxylic acid (2,6-NDA), 108 parts of 2,7-naphthalenedicarboxylic acid (2,7-NDA) and 50 ppm (based on the total feed) of sodium acetate were each fed into a reactor fitted with a stirrer, a nitrogen gas inlet tube and an outlet for distillate. After the purging with nitrogen, the resulting mixture was heated to 300° C. in a stream of nitrogen over a period of one hour and kept at a temperature of 300° to 320° C. for one hour to carry out a reaction while distilling off the formed acetic acid. Then, the resulting mixture was heated to 350° C. and the pressure was reduced by 10 to 15 Torr to carry out the reaction for additional 30 minutes.

The obtained polymer had an intrinsic viscosity (in o-chlorophenol) of 0.52. Further, the polymer was examined for softening point by the use of a thermomechanical analyzer (TMA) mfd. by Rigaku Denki K. K. The softening point thereof was 230° C.

The polymer was dissolved in o-chlorophenol and cast into a film. This film was examined for transparency by observation. Then, the film was kept at 160° C. in a nitrogen atmosphere for 2 hours to determine whether the transparency was maintained or not. The resulting film was transparent. Further, the film was observed under a light microscope fitted with a hot stage (mfd. by Limcome) between crossed nicols. The visual field was dark in a temperature range including the vicinity of the softening point. No transmitting light due to crystalline property or liquid-crystal property was observed.

EXAMPLES 2 AND 3

The same procedure as that described in Example 1 was repeated except that the ratio of 2,6-naphthalenedicarboxylic acid (2,6-NDA) to 2,7-naphthalenedicarboxylic acid (2,7-NDA) was changed. The results are shown in Table 1.

COMPARATIVE EXAMPLES 1 TO 3

The same procedure as that described in Example 1 was repeated except that the composition of monomers was changed as shown in Table 1. The results are given in Table 1.

COMPARATIVE EXAMPLE 4

Polyethylene terephthalate prepared by a conventional process was molded into a film not by the solvent casting method but by extrusion. This film was molten and quenched in ice-water to obtain a test piece. This test piece was evaluated in a similar manner to that described in Example 1. The results are shown in Table 1.

TABLE 1

| Experimental Example | Composition (mol) | | | Intrinsic viscosity | Softening point °C. |
|---|---|---|---|---|---|
| Ex. 1 | 2,6 NDA (0.5) | 2,7 NDA (0.5) | bisphenol A (1.0) | 0.52 | 235 |
| Ex. 2 | 2,6 NDA (0.25) | 2,7 NDA (0.75) | bisphenol A (1.0) | 0.49 | 230 |
| Ex. 3 | 2,6 NDA (0.75) | 2,7 NDA (0.25) | bisphenol A (1.0) | 0.50 | 260 |
| Comp. Ex. 1 | 2,6 NDA (1.0) | | bisphenol A (1.0) | 0.61 | 350 |
| Comp. Ex. 2 | | 2,7 NDA (1.0) | bisphenol A (1.0) | 0.47 | 170 |
| Comp. Ex. 3 | 2,6 NDA (0.5) | 2,7 NDA (0.5) | hydroquinone (1.0) | insoluble | >350 |
| Comp. Ex. 4 | terephthalic acid (1.0) | | ethylene glycol (1.0) | 0.77 | 256 |

| Experimental Example | Transparency | | after thermal aging | | Characteristics of film |
|---|---|---|---|---|---|
| | appearance | visual field* | appearance | visual field | |
| Ex. 1 | transparent | dark | transparent | dark | flexible and tough film |
| Ex. 2 | transparent | dark | transparent | dark | flexible and tough film |
| Ex. 3 | transparent | dark | transparent | dark | flexible and tough film |
| Comp. Ex. 1 | opaque | darkened at | — | — | hard and brittle film |

TABLE 1-continued

|  |  | softening point |  |  |  |
|---|---|---|---|---|---|
| Comp. Ex. 2 | transparent | dark | transparent | dark | flexible but deformed by thermal aging |
| Comp. Ex. 3 | opaque | — | — | — |  |
| Comp. Ex. 4 | transparent | darkened at softening point | opaque | darkened at softening point | flexible but brittle after thermal aging |

*visual field of a microscope fitted with a hot stage between crossed nicols.

We claim:

1. A wholly aromatic polyester capable of forming an article which exhibits excellent transparency and heat resistance consisting of moieties (1), (2), (3), and (4) which are joined to form recurring ester groups wherein:

(1) is 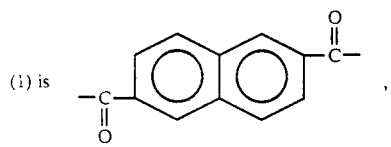

(2) is 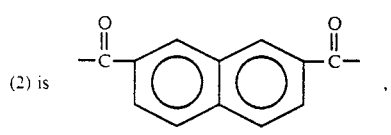

and (3) is 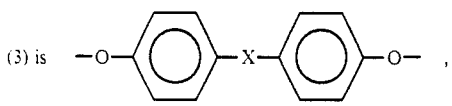, wherein X is at least one group selected from the group consisting of alkylene, alkylidene, —O—, —S—, SO₂— and —CO—; wherein moieties (1) and (2) are each present in a concentration of 5 to 95 mole percent based upon the total molar concentration of moieties (1) and (2); and wherein (4) is derived from at least one naphthalenedicarboxylic acid which forms moieties other than moieties (1) and (2) in a concentration of 0 to 15 mole percent.

2. A wholly aromatic polyester capable of forming an article which exhibits excellent transparency and heat resistance according to claim 1 wherein moiety (1) is present in a concentration of 20 to 90 mole percent based upon the total molar concentration of moieties (1) and (2), and moiety (2) is present in a concentration of 10 to 80 mole percent based upon the total molar concentration of moieties (1) and (2).

3. A wholly aromatic polyester capable of forming an article which exhibits excellent transparency and heat resistance according to claim 1 wherein moieties (1) and (2) are each present in a concentration of 25 to 75 mole percent based upon the total molar concentration of moieties (1) and (2).

4. A wholly aromatic polyester capable of forming an article which exhibits excellent transparency and heat resistance according to claim 1 wherein moieties (1) and (2) are each present in a substantially equal molar concentration.

5. A wholly aromatic polyester capable of forming in article which exhibits excellent transparency and heat resistance according to claim 1 wherein said polyester contains in a quantity up to 15 mole percent moieties derived from at least one naphthalenedicarboxylic acid which forms moieties other than moieties (1) and (2).

6. A wholly aromatic polyester capable of forming an article which exhibits excellent transparency and heat resistance according to claim 1 wherein X of formula (3) is selected from the group consisting of:

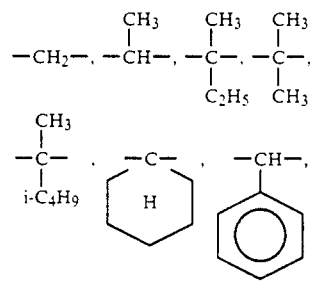

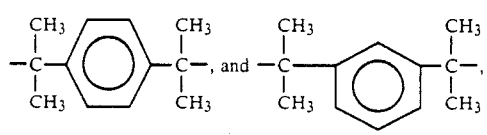

and mixtures of any two of the foregoing.

7. A wholly aromatic polyester capable of forming an article which exhibits excellent transparency and heat resistance according to claim 1 wherein X of formula (3) is a propylidene group.

8. A wholly aromatic polyester capable of forming an article which exhibits excellent transparency and heat resistance according to claim 1 which includes in a quantity up to 95 percent by weight of the total composition of particulate filler.

9. A wholly aromatic polyester capable of forming an article which exhibits excellent transparency and heat resistance according to claim 1 which includes 1 to 80 percent by weight of the total composition of particulate filler.

10. A wholly aromatic polyester capable of forming an article which exhibits excellent transparency and heat resistance according to claim 1 which includes 1 to 80 percent by weight of the total composition particulate filler which is present in powder and fibrous forms.

11. A wholly aromatic polyester capable of forming an article which exhibits excellent transparency and heat resistance according to claim 1 wherein moiety (4) is absent.

* * * * *